United States Patent [19]

Sakamoto

[11] Patent Number: 4,624,437
[45] Date of Patent: * Nov. 25, 1986

[54] BODY-WEIGHT ADJUSTING DEVICE OF A SEAT SUSPENSION

[75] Inventor: Takao Sakamoto, Akishima, Japan

[73] Assignee: Tachikawa Spring Co. Ltd., Japan

[ * ] Notice: The portion of the term of this patent subsequent to Sep. 16, 2003 has been disclaimed.

[21] Appl. No.: 688,918

[22] Filed: Jan. 4, 1985

[51] Int. Cl.⁴ .................................. F16M 13/00
[52] U.S. Cl. ............................ 248/564; 108/145; 248/588; 248/594
[58] Field of Search ............... 248/588, 584, 592, 594, 248/595, 564, 574, 421, 422; 297/338, 345; 108/145; 296/65 R

[56] References Cited

U.S. PATENT DOCUMENTS

| | | | |
|---|---|---|---|
| 3,390,857 | 7/1968 | Nyström | 248/564 |
| 3,473,844 | 10/1969 | Zinnkann | 297/345 |
| 3,826,457 | 7/1974 | deLongchamp | 248/564 |
| 4,072,287 | 2/1978 | Swenson et al. | 248/588 X |
| 4,128,225 | 12/1978 | Klüting et al. | 248/421 |
| 4,151,973 | 5/1979 | Sedlock | 248/588 X |
| 4,382,573 | 5/1983 | Aondetto | 248/588 X |
| 4,448,386 | 5/1984 | Moorhouse et al. | 248/564 |

Primary Examiner—Ramon O. Ramirez
Attorney, Agent, or Firm—Hoffmann, Dilworth, Barrese & Baron

[57] ABSTRACT

A body-weight adjusting device for a seat suspension is provided including an X-shaped link mechanism constituting the seat suspension, a combination of pinions and rack gears and a pair of tension springs. Vertical movement of an operation lever causes rotation of the pinion gears and simultaneous rotation of the intermeshing rack gears, to thereby increase or decrease the tension of the tension springs. In response to such tension variation in the tension springs, the X-shaped link mechanism is raised or lowered corresponding so as to permit a selective adjustment of the seat suspension to accommodate the weight of a seated occupant.

5 Claims, 4 Drawing Figures

BODY-WEIGHT ADJUSTING DEVICE OF A SEAT SUSPENSION

BACKGROUND OF THE INVENTION

1. Field of the Invention

The present invention relates to a body-weight adjusting device for optimum use in a seat suspension of vehicles.

2. Description of the Prior Art

It has been known that a seat of a vehicle, especially a driver's seat, which is provided with a seat suspension, should be capable of adjusting the height of the seat suitably to accommodate the wieght of an occupant sitting on the seat.

Hitherto, it has been known to provide a device satisfying such requirement, a typical one of which will be described with reference to FIG. 1 of the accompanying drawings. In FIG. 1, designations (1) and (2) refer to an upper frame and a lower frame, respectively, of a seat. The lower frame (2), which is formed substantially in a rectangular shape, can be made of a metal frame and has a substantially block U-shaped cross-section with the opening of the U turned inwardly. The upper frame (1) is basically formed in flat plate-like shape with both the lateral portions, or operationally required portions thereof, being bent downwardly, and is made of a metallic material having a configuration substantially coextensive with the lower frame (2). To the upper frame (1), a cushion member can be mounted, using what may be referred to as a "cushion pan" (not shown).

Interposed between the upper frame (1) and the lower frame (2) is a pair of X-shaped links (3) which constitutes a seat suspension and is of a well-known type comprising two links (4), (5) rotatably, pivotally supported by a pivot means (6) substantially centrally of each link. The upper end portion (5a) of each of the links (5) is rotatably fixed by a pivot means (7) to the upper frame (1) rearwardly of the links, whereas the lower end portion thereof (4b) is rotatably fixed by a pivot means (8) to the lower frame (2). The other lower end portion (5b) is slidably secured to the lower frame (2) by means of a roller (9) or the like so as to be movable forwardly and backwardly relative to the lower frame (2). The forwardly-located upper end portions (4a) of links (4) are coupled by means of a rod (10) extended therebetween, thereby supporting the forward portion of the upper frame (1) in a direction from the bottom of the seat. The rearwardly-located upper end portions (5a) are coupled by means of a frame member (11) to which a pair of tension springs (12) are each secured at one end thereof.

With reference to both FIG. 1 and FIG. 2, a bell crank (14) is rotatably fixed by pivot means (13), such as to the suspension facing surface of the upper frame (1), and has an arrangement whereby one end portion thereof is engaged with a nut (21) of an adjusting spindle (15), while the other end portion thereof is rotatably connected to one end of a tension bar (16) by means of pivot (17). The tension bar (16) is connected at the other end thereof to the center portion of an equalizer frame (18) by a pivot means (19) so as to be rotatable about the pivot means (19). The equalizer frame (18) is secured at both ends thereof to the other ends of the foregoing pair of tension springs (12) respectively. The adjusting spindle (15) consists of a rotaty shaft with a thread groove (20) partially formed thereon with the nut (21) being meshed with the thread groove (20).

Substantially at the center of thus-constructed seat, a shock absorber (22) is arranged such that the one end is rotatably fixed to the rear section of the lower frame (2) and the other end is rotatably fixed to the rod (10).

Now, Several drawbacks or disadvantages are found in the above-described conventional device:

(a) The springs (12) cannot be spaced apart from each other at a great distance. Consequently, the relatively closely spaced-apart springs (12) do not provide a stable adjustment of a seat suspension when a heavy weight load is applied to the seat.

(b) For adjustment of the seat suspension to accommodate a heavy occupant, the adjusting spindle (15) has to be rotated manually at a quite number of times. For example, when it is desired to adjust the seat suspension against a variation in occupant's weight from 50 kg up to 100 kg, the adjusting spindle (15) requires approximately 16 full rotations. Furthermore, the rotation becomes more difficult as the adjustment proceeds close to 100 kg. Consequently, the operability is extremely poor.

(c) The adjusting spindle (15) is not accessible when the door of the vehicle is closed.

SUMMARY OF THE INVENTION

In order to avoid the above-mentioned drawbacks of the above conventional body-weight adjusting device, it is a primary object of the present invention to provide a body-weight adjusting device for a seat suspension having an operation lever of the type resembling a hand brake lever used in an automobile, by means of which an easy adjustment of a seat suspension can be effected to accommodate the different weights of individual occupants.

To this end, the present invention comprises an operation lever, a rotary shaft whose one end is connected to the operation lever, pinions fixed on the rotary shaft and rack gears rotatably mounted to mesh with the pinions. The rack gears are connected to the tension springs of the conventional device as previously described.

Thus, the movement of the operation lever causes the simultaneous rotation of the rotary shaft and the pinions. In response to the rotation of the pinions, mating rack gears are rotated thereby selectively increasing or decreasing the tension of the springs connected to the rack gears. Accordingly, since the springs are extended in, and secured to, the seat suspension, the adjustment of the springs in tension in this manner permits selective raising or lowering of the standing height of the seat suspension which simultaneously provides a corresponding raising or lowering of the height of the seat. This adjustment is accomplished with relative ease so that an optimum cushioning effect can readily be obtained for individual occupants of differing weight.

DETAILED DESCRIPTION OF THE INVENTION

Figure 1:
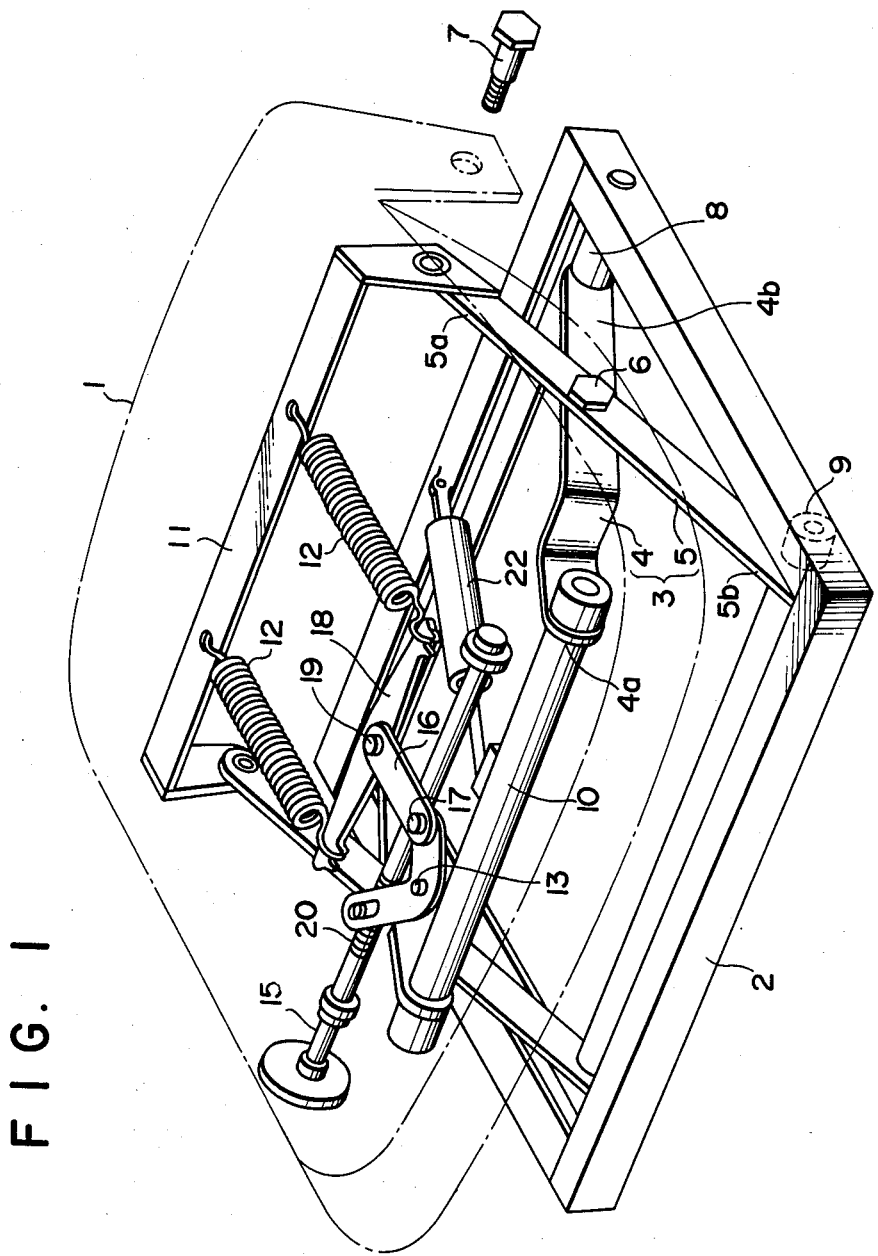
FIG. 1 is a diagrammatic perspective view of a conventional body-weight adjustment device.
Figure 2:
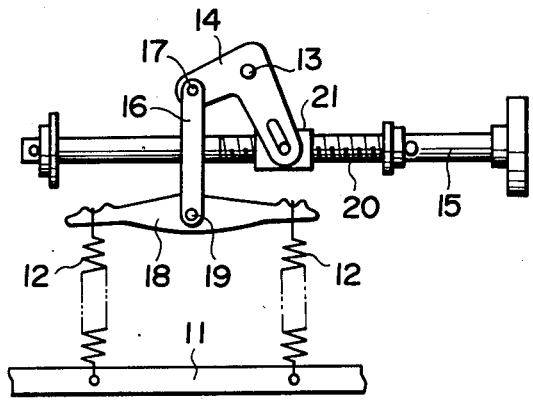
FIG. 2 is a plan view of one part of the device of FIG. 1.

One embodiment of the present invention will be described in connection with FIGS. 3 and 4. However, reference is also made to FIGS. 1 and 2 for understanding the present invention since like designations will appear which rever to like parts or components.

Figure 3:
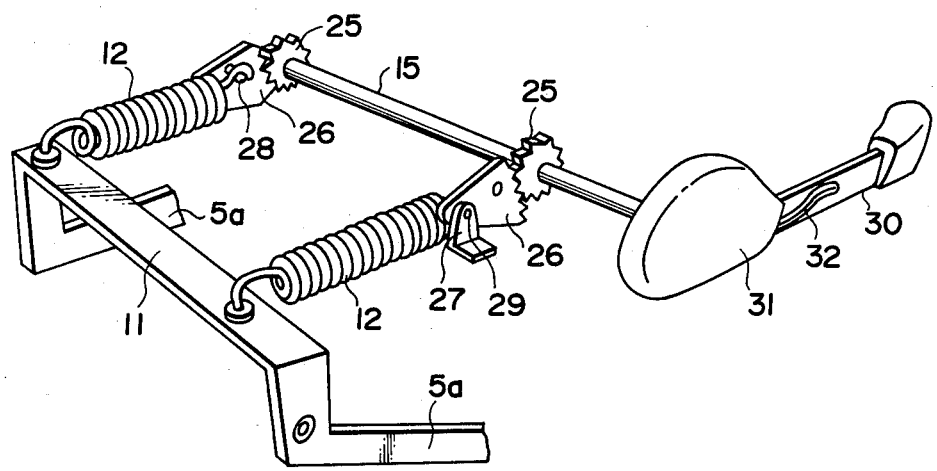
FIG. 3 is a perspective view showing the main structure of a body-weight adjusting device according to the present invention.
Figure 4:
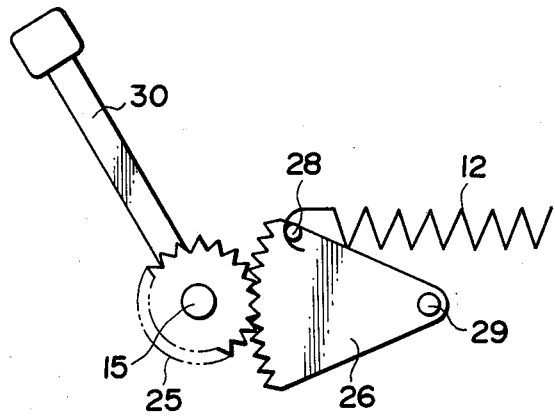
FIG. 4 is a sectional view of one part of the device of FIG. 3.

In FIG. 3, there is illustrated a device of the present invention wherein a pair of pinions (25) are fixed on a rotary shaft (15) such that they are spaced apart from each other at a predetermined distance along the axis of the rotary shaft so as to be integrally rotatable therewith. A pair of sector-like rack gears (26) can be mounted on the inner surface of the upper frame (1), through pivot means (29) and meshed with the pair of pinions (25), respectively. A bearing member (27) is provided for pivotally supporting each of the pair of sector-like rack gears (26). A pair of tension springs (12) are each connected at one end thereof to frame member 11 and, thence to X-shaped links (3), while the other end of each spring (12) is connected to protrusions (28) formed on sector-like rack gears (26). Rotary shaft (15) can, therefore, be rotated within a rotatable range which is limited to the circumferential length of the toothed portion of rack gears (26). Tension springs (12) are increased or decreased in tension via connection protrusions (28) within the rotatable range of rotary shaft (15).

Each of connecting protrusions (28) should be arranged on respective rack gears (27) so as not to pass through a dead point of the tension springs (12), or, alternatively, they may be so arranged that the connecting protrusions per se are exactly brought to the dead point of springs (12) when rotary shaft (15) is rotated to such an extent that pinions (25) reach either an upper or lower extremity of rack gear (26).

An operation lever (30) is connected to rotary shaft (15) so as to be disposed in a direction substantially perpendicularly, and preferably vertically, to the axis of said shaft, whereby the raising and lowering of the operation lever causes the shaft to be rotated integrally together therewith. In this instance, an arrangement may be provided wherein the tension of springs (12) will be set to a minimum degree when operation lever (30) is so constructed as to be tilted in its initial position at a slightly small angle relative to a horizontal line while the tension will be set to a maximum degree as a rotation limit when operation lever (30) is rotated from the initial position up to the rotation limit.

Further with respect to the present invention, a braking mechanism or locking means (31) can be provided on operation lever (30) or rotary shaft (15) as shown in FIG. 3. Since locking means (31) per se is one of a well-known type, the detailed description thereof is omitted here. However, it includes an unlocking lever (32) for releasing operation lever (30) from the locked condition caused by locking means (31). Unlocking lever (32) is so formed as to project from locking means (31) in a substantially parallel relation therewith, thus permitting single band access to both operation lever (30) and unlocking lever (32). In other words, it is possible for an occupant to push the unlocking lever (32) simultaneously while gripping operation lever (30), employing the same hand to actuate locking means (31) so as to release lever (30) from its locked state. Then, operation lever (30) can readily be operated for adjusting the seat suspension in accordance with the weight of the occupant. Locking means (31) is, however, not confined to this structure but may be of a different construction.

With the present invention constructed in the above-described manner, it is understood that unlocking lever (32) is operated to release operation lever (30) from the locked condition caused by locking means (31). Then operation of lever (30) causes rotary shaft (15) to rotate driving the pair of pinions (25) to rotate, thus moving a pair of mating sector-like rack gears (26) so as to increase or decrease the tension of springs (12). The increase or decrease of tension in springs (12) causes X-shaped links (3) to be raised or lowered in standing height whereby the seat supported on X-shaped links (3) can be adjusted in height to accommodate the weight of an individual occupant. When operation lever (30) is brought to a stop at a desired position, it is automatically locked by locking means (31) thereby preventing further rotation of rotary shaft (15).

In view of the above, movement of operation lever (30) can be simply performed in a vertical direction with respect to a seat. Thus, the operation of the body-weight adjusting means of the present invention is greatly improved in that an occupant can adjust the seat suspension in the seated position with the door of the vehicle closed. Furthermore, modification of operation lever (30) to make it somewhat longer offers the advantage of enabling an occupant to operate the lever with even less force and thereby more easily adjust the seat suspension of his or her particular weight.

Thus, while there have been described what are presently believed to be the preferred embodiments of the present invention, those skilled in the art will realize that changes and modifications can be made thereto without departing from the true scope of the invention, and it is intended to claim all such changes and modifications as fall within the full scope of the invention.

I claim:

1. A body-weight adjusting device for a seat suspension which comprises:
    (a) a pair of X-shaped links constituting said seat suspension;
    (b) a rotary shaft extending in a transverse direction of said pair of X-shaped links;
    (c) an operation lever connected to one end of said rotary shaft in such manner that it is disposed in a direction substantially perpendicularly to the axis of said rotary shaft;
    (d) at least one pinion gear fixed on said rotary shaft for integral rotation therewith;
    (e) at least one rack gear, rotatably fixed to mesh with said pinion gear;
    (f) at least one tension spring operatively connected at one end to said X-shaped links and latched at the other end to said at least one rack gear
    whereby said rotary shaft rotated by operation of said operation lever drives said rack gear and, consequently, said tension spring, to adjust said X-shaped links.

2. The body-weight adjusting device of claim 1 wherein said operation lever is disposed substantially vertically whereby an occupant of the seat supported by said suspension has access thereto while seated.

3. The body-weight adjusting device of claim 1 wherein there are two said pinion gears fixed at a predetermined distance from each other, two said rack gears are pivotally supported to mesh with said two pinion gears, and two said tension springs operatively extending between said X-shaped links and said two rack gears.

4. The body-weight adjusting device of claim 3 wherein said tension springs are operatively connected to said X-shaped links through a frame member extending transversely to said links.

5. The body-weight adjusting device of claim 1 wherein said operation lever further comprises locking means which retains said rotary shaft in a selected position attained by rotating said operation lever, said locking means having release means cooperatively secured therewith for manual release of said locking means.

* * * * *